United States Patent [19]

Kantor

[11] 3,981,627

[45] Sept. 21, 1976

[54] ROTARY THERMODYNAMIC COMPRESSOR

[76] Inventor: Frederick W. Kantor, 523 W. 112th St., New York, N.Y. 10025

[22] Filed: Apr. 16, 1974

[21] Appl. No.: 461,452

Related U.S. Application Data

[60] Division of Ser. No. 864,112, Oct. 6, 1969, Pat. No. 3,808,828, which is a continuation-in-part of Ser. No. 608,323, Jan. 10, 1967, Pat. No. 3,470,704.

[52] U.S. Cl. ................................. 417/207; 417/244
[51] Int. Cl.$^2$ .......................................... F04B 39/00
[58] Field of Search ............... 62/499, 401; 417/53, 417/207, 244

[56] References Cited
UNITED STATES PATENTS

| | | | |
|---|---|---|---|
| 1,063,636 | 6/1913 | Barbezat | 417/207 X |
| 2,393,338 | 1/1946 | Roebuck | 62/499 X |
| 2,490,064 | 12/1949 | Kollsman | 62/401 X |
| 2,609,672 | 9/1952 | Wales | 62/499 |
| 3,098,602 | 7/1963 | Torluemke | 417/207 X |
| 3,347,059 | 10/1967 | Laing | 62/499 X |

*Primary Examiner*—Albert W. Davis, Jr.
*Attorney, Agent, or Firm*—Curtis, Morris & Safford

[57] ABSTRACT

The thermodynamic compressor has a pair of conduits, each of which is wound into a group of loops arranged to form a toroid around a rotational drive axis. Each of the loops has an outwardly-extending section, and an inwardly-extending section which is spaced from the outwardly-extending section longitudinally along the rotational axis of the shaft. Each group of loops has the same number of loops in it, and corresponding loops in each of the groups are arranged directly opposite one another and working fluid is introduced in parallel into the groups of loops so that the amount of fluid in each pair of corresponding opposed loops remains the same at all times despite compression of the working fluid in the loops. The loops are arranged with the outwardly-extending sections in one plane, and the inwardly-extending sections in another plane so that heat easily can be added from the outside to the inwardly-extending sections and can be extracted easily from the outwardly-extending sections. The compressor is rotated, and each of the groups of loops forms a cascaded series of thermodynamic compressor sections. The compressor therefore uses centrifugal force to act upon opposing radial columns of working fluid having different densities caused by the heat transfer to and from the compressor, thus providing an extremely effective rotary compressor. The thermodynamic compressor of this divisional patent application is illustrated in FIGS. 12 and 13 of the drawings.

3 Claims, 15 Drawing Figures

ROTARY THERMODYNAMIC COMPRESSOR

This patent application is a division of U.S. patent application Ser. No. 864,112 filed Oct. 6, 1969, now U.S. Pat. No. 3,808,828 which is a continuation-in-part of U.S. patent application Ser. No. 608,323, filed on Jan. 10, 1967, now U.S. Pat. No. 3,470,704, issued Oct. 7, 1969. The disclosure of that patent hereby is incorporated herein by reference.

In brief, my above-identified co-pending patent application describes a rotary heat pump device and method in which a working fluid is rotated in a rotary enclosure, with the fluid moving first away from and then towards the axis of rotation in a closed-loop path within the enclosure. The fluid is moved in its closed-loop path means of a thermodynamic pump which makes use of the differing densities and differential centrifugal forces on the working fluid to pump the fluid through the closed loop path. The use of both gases and liquid-gas combinations as working fluids is described in my co-pending application.

The invention of my co-pending application is highly advantageous. However it is often desirable to tailor a thermodynamic system to a particular application, for which use the overall thermodynamic efficiency of the system may be compromised: one purpose of this application is to set forth specific ways in which such compromises can advantageously be made, for a wide range of operating conditions.

Accordingly, it is an object of the present invention to provide thermodynamic apparatus which is an improvement of the invention described in that patent application. More specifically, it is an object of the present invention to provide a rotary thermodynamic device which can be made even smaller than before, can be operated with a variety of different heat and rotary power sources, is very flexible in the speed at which it can rotate, in the types of working fluids it can use, and in the different temperatures and pressures at which it can operate. Furthermore, it is an object of the present invention to provide such a device which is relatively simple and inexpensive to construct, and which is reliable in operation.

The drawings and description which follow describe the invention, and the manner in which it meets the foregoing objectives.

Figure 1:
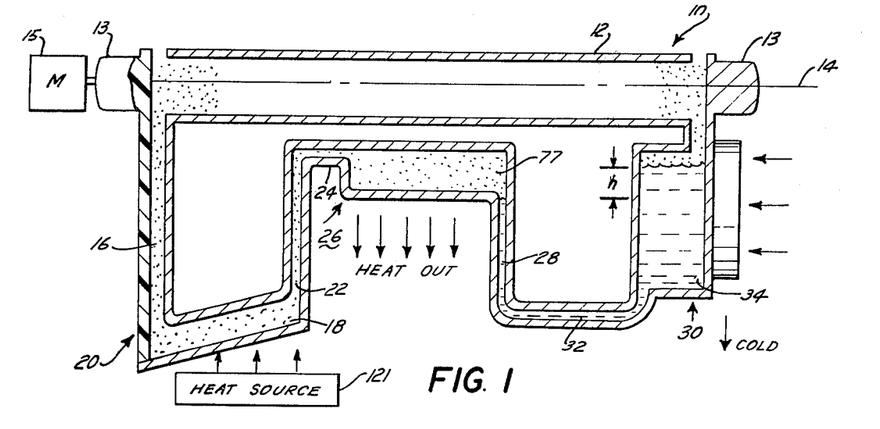
FIG. 1 is a schematic view of one embodiment of the present invention.

In drawings:

FIG. 1 is a schematic view which is used to faciliate explanation of the principles of operation of the invention.

GENERAL DESCRIPTION

FIG. 1 shows one half of a rotor structure 10 having solid end shaft members 13, one of which is operatively connected to motor 15 for rotating the device. Rotor 10 defines a closed-loop fluid flow path which includes a tube 12 positioned on the axis of rotation 14. Working fluid flows through tube 12 in the gaseous state to a thermodynamic compressor 20 where it is compressed and then is supplied to a condenser 26 and an evaporator 30. Vapor formed in the evaporator flows into the tube 12 for return to the compressor.

The compressor 20 includes a conduit 16 communicating with the interior of tube 12 at one end and extending radially outwardly to another conduit 18 which extends back toward the rotational axis 14 at an acute angle, and communicates with another conduit 22 which extends radially inwardly toward the axis 14. The operation of the thermodynamic compressor 20 is fully explained in the above-mentioned co-pending application, which should be referred to for a detailed discussion of the principles involved. The result is that the working fluid flows through the closed loop in the rotor 10, and the gas supplied to the condenser is compressed to a pressure above that which the gas has at the axis 14.

LIQUID BACK PRESSURE SOURCE

The working fluid chosen for use in this embodiment of the heat pump preferably is one which remains in a gaseous state in the compressor 20. Also, it is preferred that the working fluid liquifies and vaporizes during the refrigeration cycle. A number of well-known refrigerants such as those sold by DuPont under the trademark "Freon" meet these specifications.

In the device illustrated in FIG. 1, the preferred working fluid remains gaseous in the compressor 20 and the compressed gas in the conduit 24 is supplied to a condensor 26 at a pressure substantially higher than that of the vapor entering the compressor. When such a fluid is used, and when the dimensions and rotational speed of the device are properly set, and when a relatively cool ambient fluid, such as air is directed towards the condenser 26 to absorb the heat of condensation, the gas will condense in chamber 77. The liquefied gas then flows through the radial conduit 28 and the longitudinally extending conduit 32 into the chamber 34 of evaporator 30.

Due to evaporation at reduced pressure of the liquid in the evaporator, the temperature of the liquid will drop, thus absorbing heat from air or other fluid which is in contact with the outside walls of the evaporator.

The vapor is then removed from chamber 34 under the influence of thermodynamic compressor 20, which thereby maintains this reduced pressure in chamber 34.

The action of centrifugal force on the column of liquid having a length equal to the radii "$h$" between the distances of the innermost surfaces of the columns of liquid in the conduit 28 and the chamber 34 produces a back-pressure on the fluids upstream from the condenser and thus provides a back-pressure comparable to that which might be provided by an expansion nozzle such as is described in my above-identified co-pending application. The elimination of the nozzle makes the system self-adjusting so that it cannot as easily be driven outside its operating range by placing too large or too small a heat load on it, since the condenser and evaporator are in equilibrium and pressure differences between the two chambers are balanced by the differences in heights of the columns of liquid in the evaporator and duct 28. Thus, the range of temperatures, pressures and rotational speeds at which the device can be operated is increased. In addition, by moving the liquids between the reservoirs near the rim of the rotor 10, and by moving gases at the axis, the irreversible thermodynamic losses incurred in devices such as those shown in U.S. pat. No. 3,397,739 due to raising the liquid back towards the axis by pressure and then spilling it out towards the rim in another chamber are avoided. Also avoided are thermodynamic losses which result from liquid-gas "hang-up", a term which is used herein to describe the difficulty which arises in prior art devices of the type shown in the aforementioned patent when liquids and gases interfere with one another when both must flow through the same passageways near the rim of a rotary heat pump device.

Figure 2:
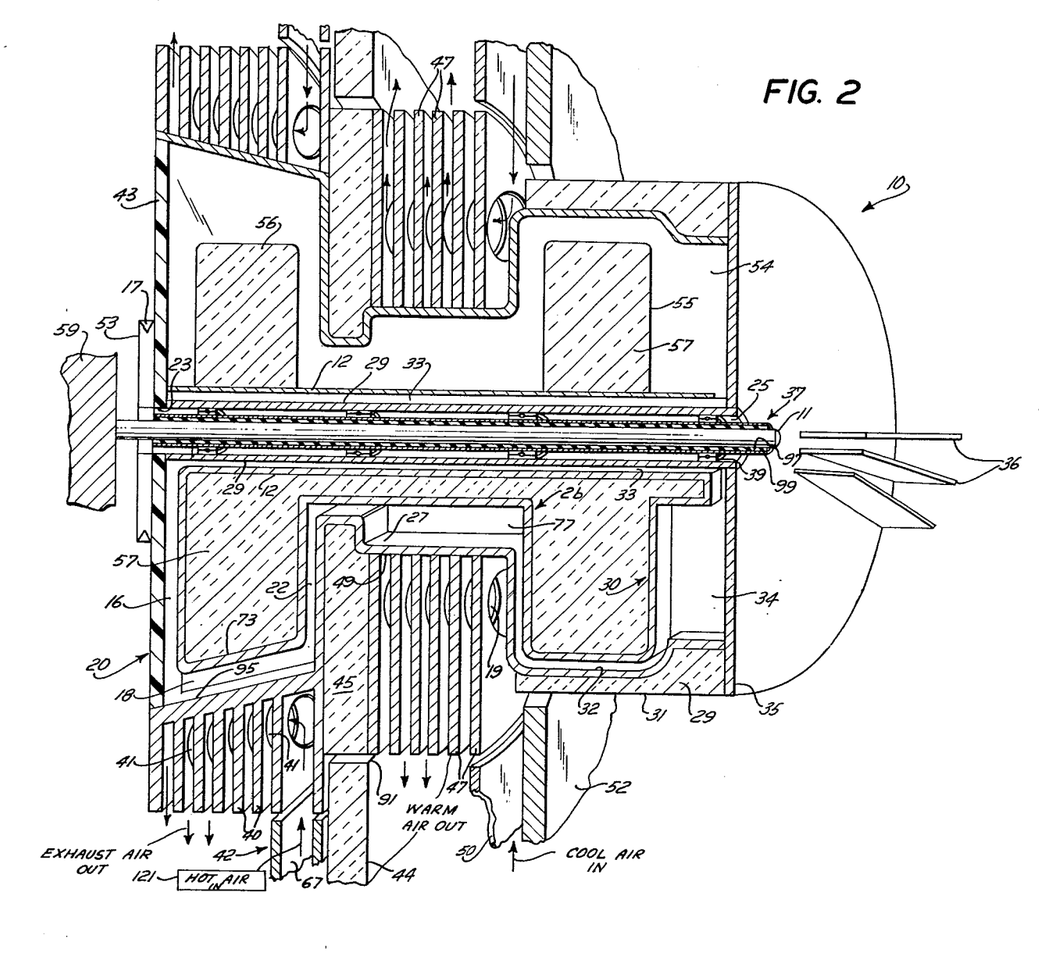
FIG. 2 is a perspective, partially broken-away and partially schematic view of an embodiment of the invention which is similar to that shown in FIG. 1.

The device shown in FIG. 2 is similar to the device shown in FIG. 1, and corresponding parts in the two devices are given the same reference numerals. The device comprises a rotor structure 10 mounted for rotation on a shaft 11 which is fixed in a support block 59. The device can be rotated by any conventional drive means, such as a pulley 53 fixed to the rotor 10 and driven from a power source (not shown) by a V-belt 17. It is an advantage of heat pumps of this type that the rotary drive source need not be very powerful since its only function is to maintain the rotational speed of the rotor 10 and to drive the fan blades secured to the rotor. The work necessary for driving the compressor and operating the refrigeration portion of the device is drawn from the heat source 121. Thus, no other energy source for circulating the working fluid is required.

The heat pump of this embodiment includes a plurality of spacers 54, preferably of thermal insulating material, each of which abutts tube 12 at one edge and extends outwardly to the inner surfaces of the outermost walls 95 and 27 of the compressor 20 and condenser 26, and to the inner surface of the outer walls of the conduits and chambers in the device. The spacers are longer than tube 12 and abut at one end against the insulating end plate 43 adjacent compressor 20 and at their opposite ends to heat conductive end plate 35. This construction separates the rotor into a plurality of compartments each of whose cross-section is shaped as a sector of a circle. The inner walls 73$a$, 73$b$, 73$c$, etc. of the various conduits and chambers within the rotor are formed by arcuate sectors 73 extending between spacers 54. Spacers 54 are provided so that the liquids and gases flowing in the various passageways of the device in a radial direction will not swirl in the rotor due to Coriolis forces. The spacers 54 also have a plurality of large holes 55 and 56 in order to minimize weight and provide access for filling the spaces between them with insulation material 57.

The section line along which the cross-sectional view of FIG. 2 is taken has been selected so as to show the spacers 54 in the upper half of FIG. 2, aand the various passageways and chambers in the lower half of FIG. 2. Certain of the walls (e.g. 73$a$, 73$b$, 73$c$) of the chambers and passageways have been omitted from the upper portion of FIG. 2 for the sake of clarity in showing the shape of spacers 54.

End plates 43 and 35 have axially aligned apertures 23 and 25, respectively, through which a stationary shaft 11 extends. An axially-extending tube 29 is positioned within tube 12 and is fixed in gas-sealing relation at each end to the plates 43 and 35 to define an annular vapor passage 33 extending axially between evaporator 30 and compressor conduit 16.

Rotor 10 is mounted on a plurality of annular bearings 39 by journal tube 29 for rotation on stationary shaft 11. The inner races of bearings 39 are seated on a composite sleeve 37 which surrounds shaft 11. Sleeve 37 is composed of a known elastomeric sleeve 97 surrounding shaft 11 and a metal tube 99 bonded to the periphery of sleeve 97 to provide constrained layer damping between rotor 10 and shaft 11. This type of sleeve structure is advantageous since it serves to damp rotational instabilities, the control of which can be a serious problem at high rotational speeds.

A plurality of fins 40 extend outwardly from the outer surface of chamber 18, and each fin has a series of peripherally-spaced holes 41. A stationary air duct 42 is formed by a pair of parallel annular plates 67 which extend around rotor 10 in close proximity to the fins 40 which are located farthest to the right in FIG. 2. Hot air is introduced into the passageway formed between the plates 67 and flows between fins 40 through the holes 41 and then moves outwardly after it has transferred its heat through the fins to the working fluid within chamber 18.

Similarly, a plurality of other radial fins 47, with holes 19 extend from the outer surface 49 of condensation chamber 77. The fins 47 are separated from the fins 40 by an annular block of insulation material 45 which is secured to the rotor 10. A stationary air guide member 44 made of insulation material extends around the outside edge of the block 45. Another annular guide 50 and an annular insulation member 52 guide cool air towards the fins 47. The air passes through the holes 19 and then outwardly from the condenser 26 after absorbing heat from it.

In the evaporator 30, a relatively large surface area of liquid is in contact with the end plate 35. The heat extracted during vaporization is extracted from the liquid, so end plate 35 is formed of heat conductive material to afford better absorbtion of heat from the environment. plate 35 is provided with fins 36 which draw ambient air or other heat exchange medium against plate 35 to transfer heat to the liquid within evaporation chamber 34 and thus cool the ambient fluid and vaporize the liquid. Of course, the device 10 can also be used for heating by the utilization of the warm air discharged from the condensation chamber 26.

Forepumps

One class of embodiments in which thermodynamic efficiency is intentionally compromised is that in which a forepump is used in conjunction with a thermodynamic compressor in order to shift the input pressure to the compressor and vary the operating temperatures and pressures of the device. For example, with a greater input pressure in the compressor, the temperature and pressure in the condenser will be increased so that it can discharge heat to higher temperature ambient fluids; alternatively, the speed of rotation can be decreased, since less centrifugal acceleration will be required for the compressor to build up the required pressure in the system. Use of a forepump allows the outwardly flowing column of gas in the compressor to have a usefully higher density than otherwise.

Entrainment Jet Forepump

One forepump which can be effectively used in the present invention is an entrainment jet pump. A system is illustrated schematically in FIG. 3 which is similar to that shown in FIG. 1, and which incorporates an entrainment jet forepump. The device includes a thermodynamic compressor 60, a condenser 62, and an evaporator 64 interconnected partially by the conduits 74 and 76. Compressor 60 includes an outwardly-extending passageway 61, an inwardly extending passageway 63 and a heated fluid return passageway 65 corresponding, respectively, to passagewaays 16, 18 and 22 of the embodiment shown in FIG. 1. Compressor 60 supplies compressed vapor through conduit 74 to the condenser 62. A radially extending passageway 78 connected to evaporator 64 and to an axially extending hollow tube 66 provides for working fluid comunication between evaporator 64 and compressor 60.

Figure 3:
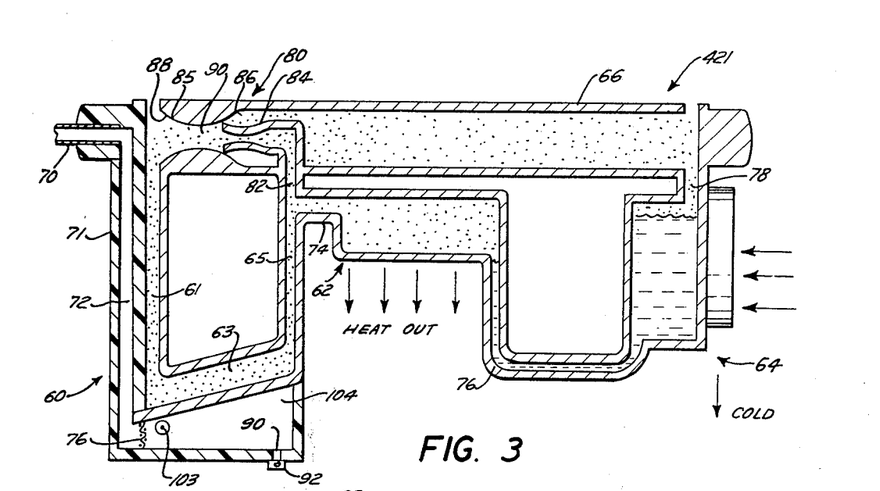
FIG. 3 is a schematic view of another embodiment of the present invention.

The return conduit 65 of compressor 60 is provided with an outlet duct 82 to permit the flow of some compressed gas from conduit 65 to an entrainment jet pump 80. Jet pump 80 includes a supersonic nozzle 84 connected to conduit 82 in which gas accelerates to supersonic speeds and draws gas vapor from the evaporator. The portion of the output vapor flow thus diverted from compressor 60 is controlled by the throat diameter of supersonic jet nozzle 84.

Entrainment jet pump 80 includes a diffuser 85 with a gas entrainment region 86, a mixing throat 90, and a regenerator nozzle 88. Gas is drawn from evaporator 64 by entrainment jet pump 80, which delivers the combined gases from evaporator 64 and conduit 82 through diffuser 85 to passageway 61 at a higher pressure than was present at the inlet to passageway 16 of the embodiment illustrated in FIG. 1. Thus, the intake pressure of the compressor 60 is higher than, and largely independent of, the pressure existing in the evaporator chamber.

By shifting the intake pressure to the compressor section 60, the thermodynamic compressor can be allowed to operate between different temperatures, and the pressure of vapor in the condenser can be increased. Thus, the operating temperature and pressure of the device can be varied over a wider range, since the condenser can then discharge heat to higher-temperature cooling fluids. In addition, the jet decreases the vapor pressure in evaporator 64 so that liquid therein will vaporize at a lower temperature. Gaseous working fluid thermodynamic compressors can be made more compact when they operate from a high inlet gas pressure than from a low inlet gas pressure, for the same total pressure difference produced. For this reason, use of a fore-pump specifically allows efficiency to be traded for reduction in size, operating speed, and structural complexity. (See discussion of cascaded gaseous thermodynamic compressors herein below).

The design and position of nozzle 84, within the entrainment section 86, can be chosen to provide an additional adjustment of the pressure within the respective chambers, since this geometry affects the amount of vapor which can be drawn into the diffuser 85. A satisfactory effect can be obtained by using a nozzle 84 having a total throat divergence angle of 8°.

The relatively cool vapor from evaporator 64 cools the relatively hotter gases received by the jet pump 80 from the compressor 60 so that the combined gases can absorb heat in duct 63 in order for the thermodynamic compressor to function. In every other aspect of the operation this device functions to provide heat exchange in the same manner as the embodiment of FIG. 1, by liquification within condenser 62 and vaporization in evaporator 64 of a working fluid.

Internal Combustion Heating and Drive Means

The embodiment of FIG. 3 also illustrates an alternative method and structure for providing heat and rotary motion to the device. A conduit 70 is provided on the axis 14 of rotor 66 and communicates with a plurality of radially extending supply ducts 72 formed as radial bores in the circular end wall 71 of the device. A combustible gas-air fuel mixture is supplied through the conduit 70 and the ducts 72 to combustion chamber 104 formed adjacent the peripheral surface of compressor 60 where the fuel is burned and heat is delivered to the gas in conduit 63. A screen 76 is provided between each of the ducts 72 and the chamber 104 to prevent flash-back of flame into the ducts and to stabilize burning. A conventional piezoelectric igniter is used to ignite the gas within chamber 104, using a piezoelectric crystal (not shown) located near the axis. As it rotates, it is struck repeatedly so that it produces electrical pulses. Thses pulses are delivered to an electrode 103 by a wire (not shown). A spark is created between the screen 76 and the electrode 103. The electrical return path from the screen 76 is through the metal of the rotor housing.

Figure 4:
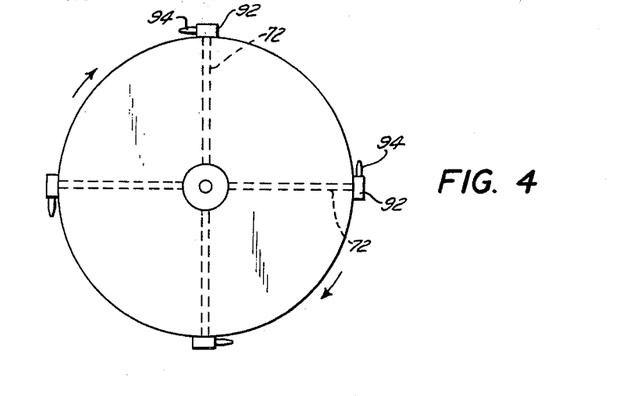
FIG. 4 is an elevation view of one end of the device shown in FIG. 3.

The products of combustion are discharged from the chamber 74 through a plurality of ducts 90. Mounted on the end of each of the ducts 90 is a discharge device 92 including a nozzle 94 which is shown in FIG. 4. The products of combustion are exhausted through the nozzles 94 as gas jets whose reaction force serves to provide torque which can rotate or assist the rotation of the entire assembly. Alternatively, the products of combustion can be returned to the axis of the rotor by an additional conduit means and exhausted to the atmosphere.

Thermodynamic Compressor Using Liquids

The embodiments of the invention illustrated in FIGS. 1 and 3 utilize thermodynamic compressors wherein the working fluid chosen remains in its gaseous state during the cycle within the compressor. As in my prior application, either an all-gaseous compressor or one which utilizes gas-liquid-gas transitions may be used in the heat pump of the present invention. However, when an entrainment jet is used in a device which incorporates a fluid that liquifies in the compressor section, communication of liquid between all of the chambers within the rotor can be permitted so that the falling head of liquid in the condenser, i.e. the column of condensed liquid moving towards the rim under the influence of centrifugal force, can be used as the falling head of liquid for the compressor. The compressor can then be used to supply all of its pressurized vapor from working fluid to drive a forepump, thus eliminating the low pressure stages in passageways 16 and 61 of the prior embodiments.

By utilizing the transitions between liquid and gas of the working fluid in the thermodynamic compressor, higher pumping pressures are achieved because the difference in densities between the column of falling liquid and the column of rising gas is larger than the difference in density between two columns of gases. The larger resulting pressures are advantageous, especially in a device to be rotated at low speeds. In addition, with this arrangement of liquid return paths, the working fluid automatically flows to the compressor and evaporator as required by heat flow needs.

Figure 5:
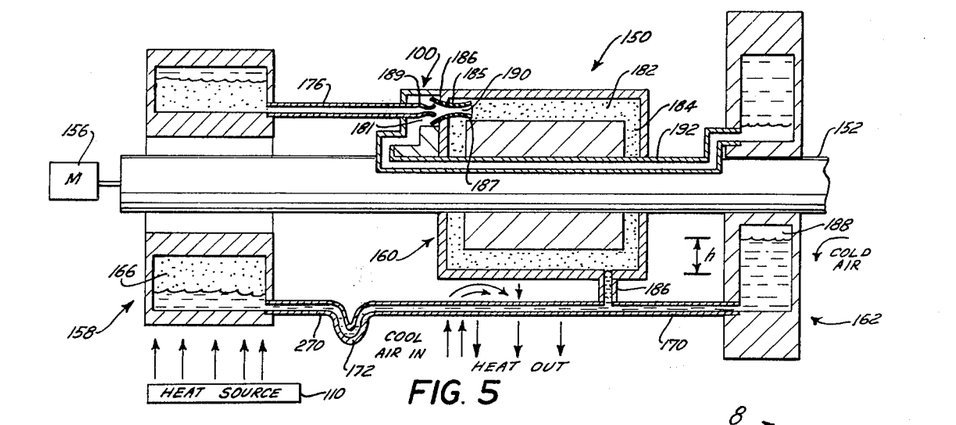
FIG. 5 is a schematic view of another embodiment of the present invention.

An alternative thermodynamic heat pump is illustrated in FIG. 5. The heat pump includes a rotor 150 with an annular boiler 158, an annular condenser 160 and an annular evaporator 162, each of which is fixed on a shaft 152. Shaft 152 is journaled in bearings (not shown) and the entire assembly is adapted to be rotated by a motor 156. A forepump 100 also is used. Pump 100 is similar to the fore-pump 80 previously discussed.

Heat is supplied from a source 110 to boil working fluid in boiler 158. High pressure vapor in the boiler chamber 166 is driven through jet nozzle 189 of pump 100 and vapor from chamber 188 is maintained at a reduced pressure. The gas mixture from the boiler 158 and evaporator 162 is driven through diffuser 185 into the condenser 160 at an intermediate pressure, wherein it condenses giving up heat to a flow of cooling fluid, such as ambient air, as indicated in FIG. 5. Since there is lower pressure in the evaporator than in the condenser, liquid rises higher (closer to the axis) in chamber 188 than in duct 186, by an amount designated "$h$" in FIG. 5. As discussed with respect to the prior embodiments, this column of liquid provides sufficient back pressure, by the free communication of liquid in the conduit 170 under the influence of centrifugal forces, so that as cooling fluid is supplied to the surface of the condenser 160 the pressurized vapor therein will liquify, and heat of condensation will be extracted from the working fluid. In each chamber, the gas pressure and the centrifugal forces on the liquid add to the same total. This is a consequence of the free flow of liquid within duct 170. Hence, in the chamber with the highest pressure, the surface of the liquid is furthest from the axis of rotation. In the condenser there is less gas pressure, so the liquid surface in duct 186 is closer to the further from axis radially than in chamber 166. In the evaporator there is even less gas pressure, so this chamber has the shortest radial distance to the liquid surface.

Since working fluid vapor in this embodiment loses heat primarily in condensing to a liquid, and heat can be extracted from the environment most effectively where liquid is evaporating, a large area of cool surface is exposed to vapor in condensation chambers 182, 184; whereas a large area of heat exchange surface is exposed to liquid in evaporation chamber 188. The gas condensing in the condenser is accessible to both the boiler and the evaporator and flows to them according to their demand for liquid as determined by the gas pressures existing within the respective chambers.

This embodiment is especially advantageous when a low speed of rotation is desired. In this case, the working fluid can be selected to have a low vapor pressure, so that the absolute pressure differences among the several chambers are small. The liquid column must be allowed to reach a radial extent sufficient to balance this absolute pressure difference, with centrifugal effects. Thus, use of a dense liquid, and low vapor pressure, allows the device to operate with low angular velocity, or small size.

Another characteristic of this embodiment is that, should more heat be added to the boiler 166, the boiler would eventually empty and liquid would flow into it through conduit 170 only according to the amount of gas which would pass through the jet, so that the boiler would then keep itself from filling. A trap 172 in conduit 170 keeps any gas from the boiler, in in this situation, from getting back to some other point in the system. In this case, by merely increasing the angular velocity of the device, the centrifugal forces acting on the column of liquid 186 can be increased to drive liquid into the boiler and increase the pressure in the jet. This allows the jet pump to deliver vapor from the evaporator into a higher pressure in the condenser, thereby allowing condensation to occur and heat to be rejected at a higher temperature. This self-adjustment allows operation over a wide range of speeds, temperatures, and heat flows. The surfaces of the three liquid columns adjust accordingly, so that the device will still operate as a heat pump and continue to condense and vaporize working fluid.

The working fluid used in this device is chosen such that with the radius and rotational velocity of the device and the pressures present in the chambers, the fluid will remain in its liquid form at the rim of the device and within the conduit 170.

As the rotor is turned and heat is added to the boiler 158 from the heat source 110, liquid will boil in the chamber 166. A liquid column is present in conduit 186 of the condenser. This liquid column is balanced by the back-pressure of the vapor in chamber 166, so that a substantial pumping pressure is provided.

Figure 6:
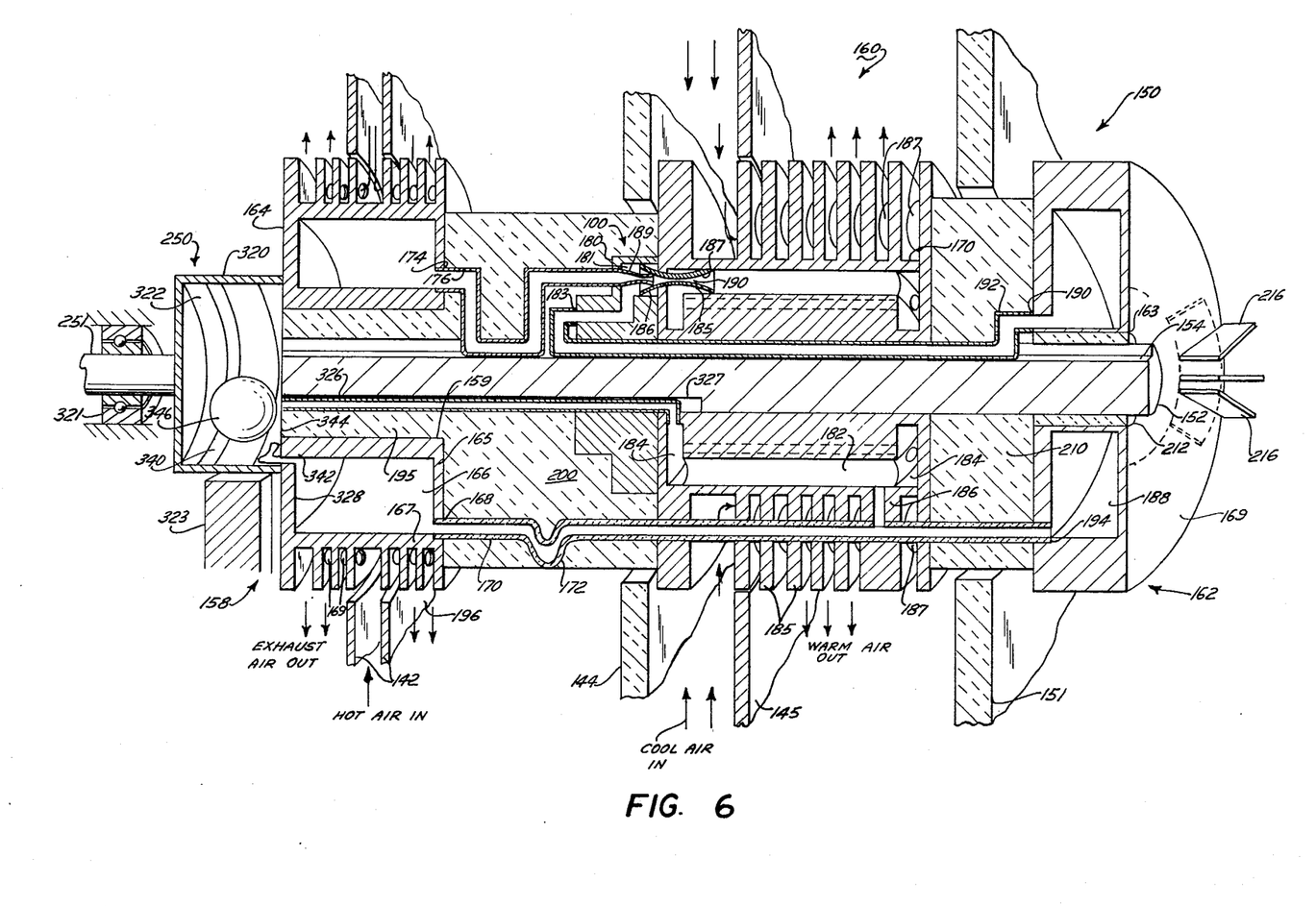
FIG. 6 is a perspective, partially broken-away and partially schematic view of a modified form of the device shown in FIG. 5.

The structural details of this embodiment of the invention are illustrated in FIG. 6. Rotor 150 includes shaft 152, having axial grooves 154 and 327 on its periphery which, as will be explained hereafter, contain various ducts communicating gases between various parts of the system. Boiler 158 is a generally cylindrical chamber having a central hole 159 in which a sleeve of thermal insulating material 195 is secured to the shaft 152. Sleeve 195 reduces heat loss from boiler chamber 166 through shaft 152. Chamber 166 is defined by generally circular end walls 164 and 165 and peripheral wall 167. A plurality of fins 196 extend outwardly from the exterior surface of wall 167 of chamber 166 and include a plurality of peripherally spaced holes 169. Hot gases flowing between a pair of plates 142 heat boiler 158. Conduit 170 communicates with chamber 166 through port 168, chambers 184 and 182 through duct 186, and chamber 188 through port 194, to permit free liquid flow between the various elements of the device. Trap 172 prevents gas flow from chamber 166 through conduit 170 as before.

Evaporator 162 is also formed as a generally cylindrical chamber, with a central hole 163 containing a sleeve of thermal insulating material 212, fixed to shaft 152, to prevent absorption of heat from shaft 152. Centrifugal fins 216 are formed on the outer wall 169 of the evaporator to draw in the fluid to be cooled and to expel cooled fluid.

Condenser 160 is fixed to shaft 152. It is a generally cylindrical housing 170 having a plurality of circumferentially spaced bores 182 extending parallel to shaft 152. A gas-conducting annular chamber 184 is provided at each end of the bores 182. A plurality of radial fins 185 having peripheral holes 187 extend from the outer surface 189 of the cylinder 170 to provide heat transfer between the working fluid condensing in the bores 182 and chambers 184 and cooling fluid supplied against the fins 185 through the guide members 144 and 145. Annular insulation member 151 provides for separation of the warm air discharged from fins 185 and cool air flowing from evaporator fins 216.

A mounting structure 180 for the jet pump 100 is secured to shaft 152 and includes vapor entrainment chamber 181.

Pump 100 includes a supersonic jet nozzle 189 which receives high pressure vapor from boiler chamber 166 through port 174 and conduit 176. Conduit 176, as illustrated in FIG. 6, is bent so that it will ride in groove 154 of shaft 152. Nozzle 189 is positioned within an entrainment chamber 181 in member 180 and gas flowing through nozzle 189 draws vapor from evaporation chamber 188 through port 190, conduit 192, and entrance port 183 of the member 180 into the condenser chambers 182 and 184.

It is noted that while a supersonic jet nozzle is described and illustrated for each of the embodiments discussed herein, it is foreseen that a sub-sonic venturi nozzle also can be used to provide pumping action in the device, as may other forms of forepumps appropriate to the operating pressures and temperatures of the device. For example, a gas bearing-supported vane can be spun by high pressures vapor from a thermodynamic compressor to act as a forepump driving low pressure vapor into said thermodynamic compressor, and serving the purpose of shifting its operating points.

Operation of the jet forepump 100 is as described above in connection with FIG. 5.

As in the embodiment illustrated in FIG. 3, the position of entrainment jet nozzle 189 in this embodiment is also selectable to adjust operating parameters.

Cylindrical blocks of insulating material 200 and 210 serve to thermally isolate the elements 158, 160 and 162 from each other, to prevent unwanted heat transfers therebetween.

Internal Gas Jet Rotary Drive

The rotor of this embodiment is rotated by the drive mechanism 250 which includes a housing 320 sealed to wall 164 of boiler 158. Housing 320 is supported for rotation with rotor 150 by shaft 251 which is journaled in bearing 321. Shaft 152 is also mounted for rotational support in bearings (not shown). An annular groove 340 is formed on the interior curved wall 322 of the housing 320. Aa ferromagnetic ball 346 is placed in groove 340 and is held in position by magnet 323 mounted outside rotor 150. Conduit 342 communicates through port 328 with chamber 166 to provide a flow of pressurized working fluid to jet nozzle 344. Gas discharged tangentially to the internal surface of housing 320 from nozzle 344 reacts against ball 346 to rotate the entire device. Ball 346 is held from moving with rotor 152 by magnet 323; housing 320 and annular groove 340 move with respect to the ball, so that ball 346 rolls in the groove as the latter is moved past the ball and the magnet. The nozzle 344 also rotates with rotor 150. The circulating gases within housing 320 rotate rapidly in the opposite direction to the rotation of rotor 150 and react against ball 346 to provide torque to rotate the device. The conduit 326, which rides in a groove 327 in shaft 152, is provided to discharge the gases in housing 320 to the condenser.

This type of drive mechanism is suitable for use in a portable system wherein rotor 150 is initially brought up to its operational speed by an external source such as a small motor or a pull cord. After the device has attained the required angular velocity, the motor or cord can be removed and the device will continuously rotate under its own power, with the only energy source being the heat energy supplied to the boiler. It is also foreseen that other forms of mechanical systems can be used in the rotor to allow the sealed thermodynamic system to provide its own rotation.

In low vapor pressure systems, forepumps of the type described should be located as near as possible to the evaporation chamber to reduce flow impedance in the conduits for the large volume of low pressure vapor therefrom.

Thin, Large-diameter Heat-pump

Figures 7, 8:
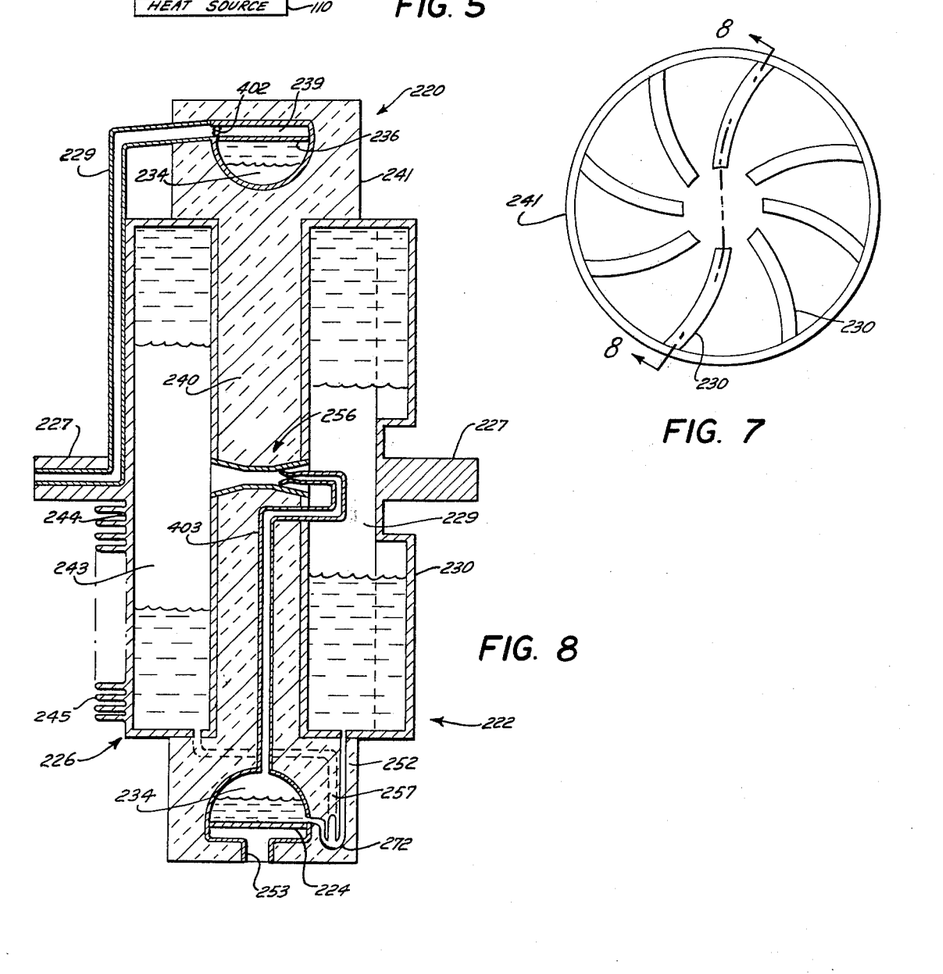
FIG. 7 is an elevation view of still another embodiment, shown in FIG. 8, of the present invention.
FIG. 8 is a cross-sectional view taken along line 8—8 of FIG. 7.

In FIG. 8 is illustrated a device providing for a relatively short flow path between the evaporator and the forepump. A relatively thin heat pump 220 is provided, having an evaporator 222, a boiler 224, and a condenser 226. Heat exchange surfaces 244 and 230 of evaporator 222 and condenser 226 are formed of thermally conductive material, and each include a shaft portion 227 by which the device is connected to a motor for rotation. In some applications, devices with this general design can be supported from one end. Condenser 226 and evaporator 222 are separated by an annular disc of thermal insulating material 240. Insulator 240 includes an enlarged peripheral ring 241 which contains annular boiler 224 and serves to thermally isolate boiler 224 from evaporator 222 and condenser 226. Conduit 252 provides free flow of liquid between evaporator chamber 243 and boiler chamber 234, and includes trap 272 which prevents back flow of gas from boiler chamber 234 to the rest of the device. Conduit 257 provides free flow of liquid from condenser chamber 243 to conduit 252 and the falling column of liquid for the thermodynamic compressor. Thus boiler 224, condenser 226 and evaporator 222 are in free liquid flow communication with each other as in the prior embodiments.

Adjoining boiler chamber 234 is an annular heating ring 239 formed adjacent the outer wall 236 of boiler 224. A flow combustible gas and air mixture, such as propane or other natural gas, is supplied to combustion chamber 239 Flame stabilization is provided by screen 402, as before. Ignition is accomplished as before, but the ignition structure is not shown. The gas is combusted within the chamber 239 to heat working fluid in boiler chamber 234 through wall 236. With wall 236 as a generally cylindrical member at the periphery of boiler chamber 234, liquid in the boiler will completely cover the hot ring. This arrangement avoids deleterious overheating of vapor within the boiler by formation of hotspots in ring 236. Exhaust duct 253 is provided in the peripheral wall of boiler 224 and communicates with chamber 239 for discharge of the products of combustion. For specific applications, electrical heating, or other heat sources, can be used. The device operates in the same manner as that discussed with regard to the embodiment of FIG. 6 in that the positions of the inner surfaces of liquid working fluid in the various chambers automatically adjusts to a wide range of operating conditions.

Vapor from the boiler chamber 234 is pumped towards the axis of rotation under the action of the falling column of liquid within the condenser chamber 243 and conduit 257. The vapor flows through conduit 403 to a supersonic entrainment jet pump 256 which operates in the manner of the entrainment jet pump 100 previously discussed. Thus, vapor within evaporation chamber 229 is entrained by jet pump 256 and supplied to the condenser chamber 243 at an intermediate pressure. In this manner, a short flow path is provided for the low vapor pressure fluid and flow impedance is greatly reduced, facilitating transfer of vapor between chambers 229 and 243.

A device of this character may be relatively thin with large diameter, and low rotational speeds may be used (e.g. less than 1,000 RPM). This is particularly advantageous for applications in home air conditioning.

Evaporator section 222 illustrated in FIG. 7 includes a plurality of hollow heat transfer fins 230 into which working fluid may enter, only a few of which are shown. The advantage of this arrangement is that heat flows perpendicularly to the material of which the side walls of the fins are made, so that these walls do not have to be formed of a highly thermally conductive material. This device can advantageously be fabricated by simple processes, and can utilize non-metallic materials. It is also noted that this arrangement avoids the problems of liquid gas "hang-up" evident in heat exchange systems using a plurality of radial loops as in U.S. Pat. No. 3,397,739 referred to earlier, since liquid is kept at the periphery of the rotor and gas is formed and exchanged between chambers near the axes thereof. A hollow fan heat exchanger of this character may be used with any of the evaporators previously discussed.

Condenser 226 used in the embodiment illustrated in FIG. 8 includes an exterior heat transfer wall 224 which has a plurality of small fin extensions 245 formed on its entire surface. These extensions are in the form of thin rods, and provide an enlarged surface area for turbulent flow heat transfer with the ambient fluid. This type of heat exchanger wall also may be alternatively used in any of the heat exchangers previously discussed in lieu of the fins shown therein, and can also be easily formed.

MULTIPLE WORKING FLUIDS

The entrainment jets illustrated in the various embodiments of this invention, such as these shown in FIGS. 6 and 7, operate on the principle of momentum mixing; the momentum of the high pressure fluid, as it passes through the entrainment chamber, is added to the momentum of the low pressure fluid from the evaporator to achieve the final momentum of working fluid, which is converted to pressure for entering the condenser. The actuating vapor for the jet can be chosen to transport less heat per unit momentum than does the entrained vapor from the evaporator. For example, the actuating vapor can have a much higher molecular weight than the entrained vapor. This allows more efficient operation of the heat pump. Since the vapor forms of the working fluids are mixed by the jet pump in the condenser, they are chosen such that their liquid forms are immisicble and can be separated on leaving the condenser. Use of separate working fluids in the compression and the refrigeration parts of the heat pump allows selection of a high boiling temperature fluid for the compressor: this can extract heat from a high temperature source more efficiently, and contributes less to back pressure in the condenser. Some combinations of liquids that could be used in such a system would be several of the flourinated hydrocarbons, e.g. some of those sold by DuPont under the trademark Freon (on compressor), and water (in evaporator).

Figures 9, 10, 11:
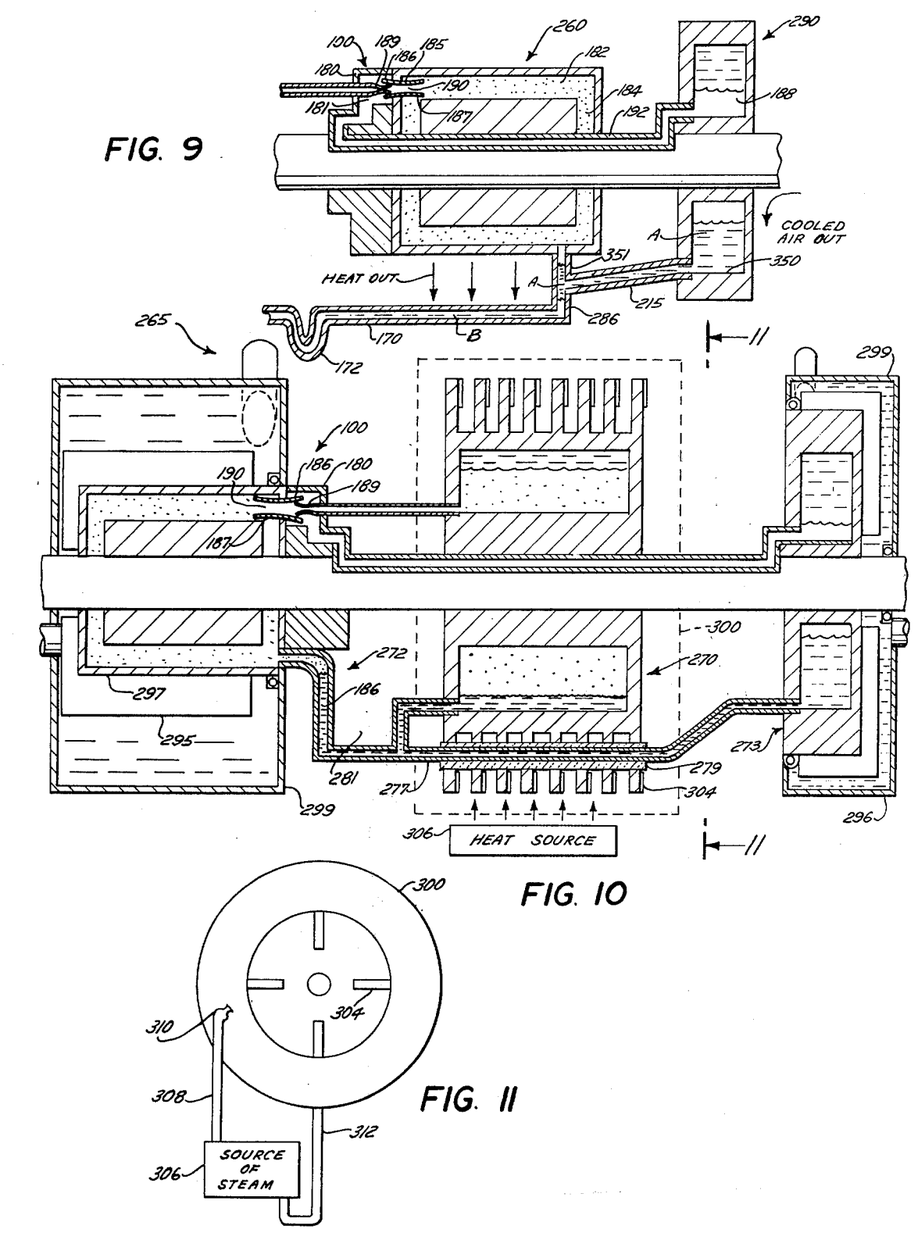
FIG. 9 is a schematic view of a modified condenser for use in the embodiment shown in FIG. 6.
FIG. 10 is a schematic view, similar to that of FIG. 5, of another embodiment of the present invention.
FIG. 11 is a cross-sectional view taken along the line 11—of FIG. 10.

In FIG. 9, there is partially illustrated a condenser 260 and evaporator 290 which permit the incorporation of the use of immiscible fluids in a heat exchanger similar to that disclosed in FIG. 6. The boiler section of this device is the same as the boiler 158 of the device illustrated in FIG. 6 and so is not illustrated.

The condenser 260 is substantially the same as that illustrated in FIGS. 5 and 6, with the exception that the portion of conduit section 170 of the prior embodiments, which extended between port 194 of the evaporator and conduit 186 of the condenser is replaced by a conduit 215 which joins conduit 286 of the condenser 260 at a point closer to the axis of rotation of the rotor than did the conduit 170. Conduits 286 and 270 correspond, respectively, to conduits 186 and 170 of the prior embodiments and function in the same manner. When a high density working fluid is used in the boiler to drive the jet entrainment pump 100 and draw vapor from the evaporation chamber, the immiscible fluids will condense in the bores and chambers 182 and 184 of the condenser 260 as did the single vapor before. However, due to the higher density of the fluid labeled B in FIG. 9, as compared to the density of fluid labeled A, it will move to the rim of the rotor, that is, further down the conduit 286, and return to the boiler chamber 188 through conduit 270 as in the prior embodiments. Conduit 215 communicating with conduit 286 at a point closer to the axis of rotation of the device, will permit flow of fluid A back to the evaporator. Fluids A and B in these various conduits serve, in the same manner as fluid in conduit 186 of FIG. 6, as the dense column of a thermodynamic compressor, to drive gas vapor in chamber 188 through entrainment jet fore-pump 180. Outer wall 350 of the evaporator chamber 188 should be located closer to the central axis than the junction 351 of conduit 286 with conduit 195. Also, conduit 215 slopes inwardly toward the axis without forming any trap in which denser liquid could accumulate. This arrangement is provided in order to faciliate starting of the device, by ensuring that the fluids will be properly separated by centrifugal effects during start-up. In all other respects, this device operates in the same manner as the device of FIGS. 5 and 6, by liquification and vaporization of working fluid A within the condenser and evaporator. Working fluid B acts only in the thermodynamic compression branch of the flow, replacing the use of the evaporator working fluid used for this branch in the embodiments in FIGS. 5 and 6.

Condenser-boiler Reversal

Referring now to FIG. 10 there is illustrated a heat pump 265 which is substantially the same design as the heat pump illustrated in FIG. 6, except that the locations of the condenser 272 and the boiler 270 have been interchanged. Condenser 272 and evaporator 273 are positioned in fluid containing ducts 299, 296 respectively. Duct 299 contains the flow of relatively cool liquid, for example water, for absorbing heat from condenser 272 and duct 296 contains flow of liquid, e.g. water, which is to be cooled by evaporator 273.

In condenser 272 heat exchange with the liquid in duct 299 is provided across wall 297 which has centrifugal fins 295. Evaporator 273 is also provided with centrifugal fins 299 to absorb heat from the surrounding liquid medium within duct 296. As a result of the changed positions of boiler 270 and condenser 272, the construction of conduit 170 of the prior embodiments, which provided free flow of liquid between the boiler condenser and evaporator, must be modified. As seen in FIG. 10, conduit 277 provides free liquid flow commication between the falling column of liquid in conduit 186 of condenser 272 and boiler 270 to form a thermodynamic compressor as in the prior embodiments. A trap 281 is formed in conduit 277 to prevent vapor leakage into the system from boiler 270. Branched conduit 277 provides free liquid flow between condenser 272 to evaporator 273, so that liquid can flow to the evaporator from the condenser. A sleeve of thermal insulating material 279 surrounds conduit 277 to prevent absorption of heat by the liquid therein from the heat source 306 for boiler 270.

Steam Jet Heating and Drive Means

Fins 302 having canted members 304 formed thereon are provided on boiler 270 in lieu of the apertured vanes of the prior devices. In this manner, boiler 270 may be driven from an external source, such as steam jet nozzle 310 (See FIG. 11). Steam is provided from source 306 through duct 308 for discharge by nozzle 310. The steam serves to heat the working fluid contained in boiler 270 and at the same time rotates the entire assembly by its application of a driving force on members 304.

Boiler 270 is surrounded by a generally circular housing 300 indicated by dashed lines in FIG. 10 and more fully illustrated in FIG. 11. Steam discharged by jet 310 condenses within the housing 300 and is returned to source 306 through conduit 312. Thus, the heat pump of this embodiment will be rotated by a flow of fluid in its environment, and will also cause flow of fluid in its surrounding environment, i.e. it is rotated by fluid from jet 310, and will move the fluid in chambers 299 and 296, due to its rotation: the vanes 295 on the condenser 272 will move the cooling liquid through duct 299 and the vanes 275 on the evaporator 273 will similarly move the liquid to be cooled within duct 296. Other than this novel arrangement wherein the heat pump is rotated by its environment and serves to circulate fluids in its environment, heat pump 265 operates in the same manner as the apparatus discussed above with reference to FIG. 6 and like numerals herein illustrate corresponding parts.

Cascaded Thermodynamic Compressor

Figures 12, 13:
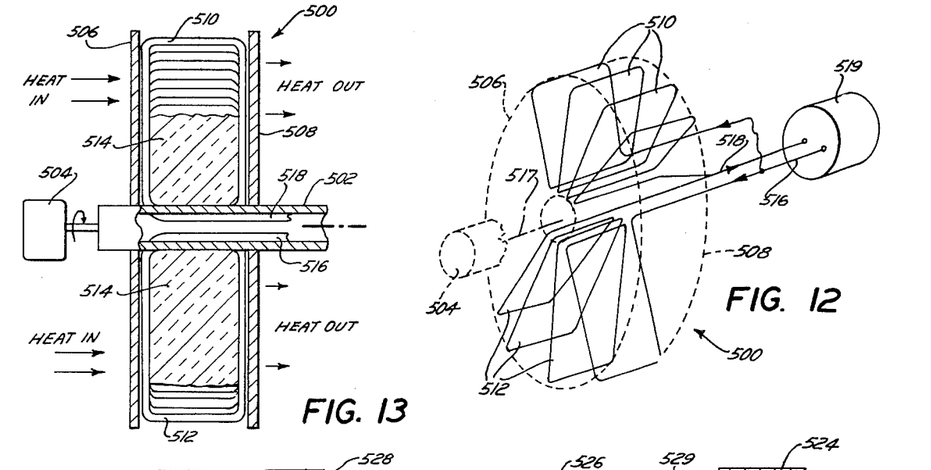
FIG. 12 is a schematic perspective view of another embodiment of the present invention.
FIG. 13 is a partially schematic cross-sectional view of a portion of the device shown in FIG. 12.

FIGS. 12 and 13 show a cascaded multi-stage thermodynamic compressor 500 for use in the present invention.

As is shown schematically in FIG. 12, the compressor 500 includes two groups of loops 510 and 512 of tubing. Each group of loops is formed by winding a single length of tubing in a pattern tending to form a toroid. Each loop 510 is opposite to a loop 512 in the opposite group, and the loops are arranged symmetrically with respect to the central axis 517 of the toroid.

The starting end of the upper group of loops 510 is connected to the starting end of the opposite group 512. This connection is indicated by reference numeral 516. Similarly, the trailing ends of the groups are connected together as indicated at 518. Thus, the two groups are connected together in parallel. A refrigeration unit 519 is connected to the conduits 516 and 518. The regrigeration unit 519 contains means of the type described above for centrifugally compressing, expanding and returning a working fluid to the compressor 500 through the conduit 516 in a closed loop path. The compressor 500 and the refrigeration unit 519 are connected together to be rotated as a rotary heat pump unit by a motor 504.

As is shown in FIG. 13, the loops 510 and 512 are secured between a pair of heat conducting metal plates 506 and 508 by means of welding or soldering. The plates 506 and 508 are secured to a hollow shaft 502 through the center of which pass tubes 516 and 518. Insulation 514 fills the toroidal hole formed by the loops 510 and 512. The plates 506 and 508 may have suitable heat transfer fins on their outer surfaces.

The compressor 500 operates as follows: Heat is added to the portions of the loops in which the working fluid flows towards the axis 517 by heating the plate 506, and the portions of the loops in which the fluid flows away from the axis 517 are cooled by cooling the plate 508. Rotation of the loops amplifies the pressure difference between the outwardly and inwardly flowing fluid columns in each loop in the manner discussed above. Since the loops in each group are connected together in series, the compression produced by each loop is added to that produced by the other loops in the group, with the result that relatively high total fluid pressures can be produced with working fluids of relatively low density, or with use of relatively low rotational speeds, or with rotary devices having relatively small diameters. Alternatively, rather than using this embodiment of the invention to reduce the foregoing parameters, it can be used simply to produce very high total fluid pressures.

The arrangement of the loops into two parallel-connected groups is made in order to ensure that opposite portions of the rotary structure will have the same amounts of fluid in them at the same time and the rotational balance of the structure will be maintained.

Modular Heat Pump Structure

Figure 14:
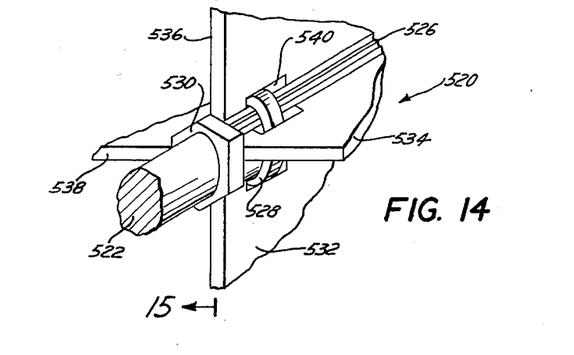
FIG. 14 is a partially broken-away perspective view of still another embodiment of the present invention.
Figure 15:
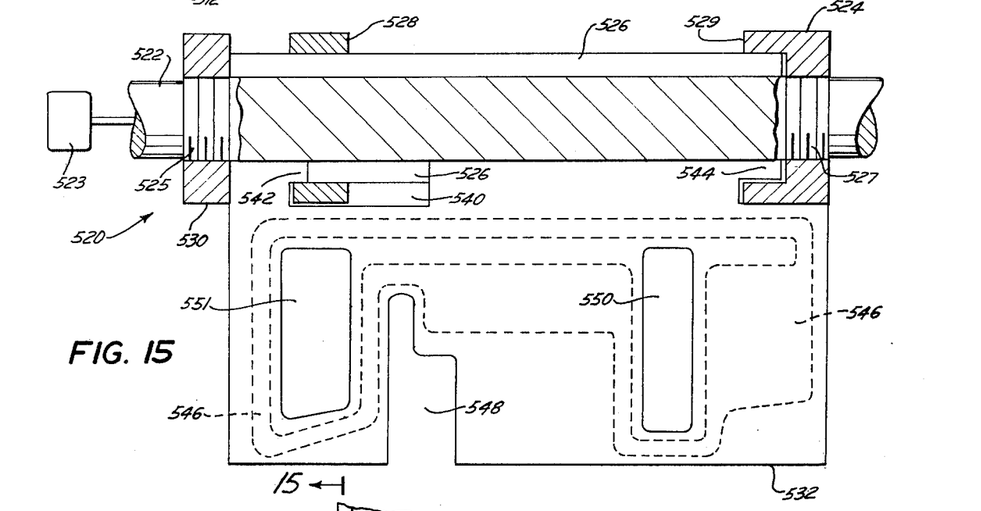
FIG. 15 is a cross-sectional view, partially disassembled, taken along line 15—15 of FIG. 14.

FIGS. 14 and 15 of the drawings show a thermodynamic device 520 composed of a spindle 522 with several separate closed-loop heat pump units 532, 534, 536 and 538 (See FIG. 14) detachably secured to the spindle. Each heat pump unit is shaped like a fan blade and contains fluid flow conduits and chambers 546 (See FIG. 15) which are shaped and operate as described above. Thus, each heat pump unit serves both as an air or liquid impeller, and as a self-contained heat pump. When the spindle is rotated by a drive motor 523, each separate heat pump contributes a proportional share to the total heating or cooling produced by the device 520.

FIG. 15 is a cross-sectional view, taken along line 15—15 of FIG. 14, in which the heat pump unit 536 has been removed for the sake of clarity in the drawings. Thus, only one heat pump unit 532 is shown in FIG. 15.

The spindle 522 has a plurality of longitudinal grooves 526, one for each of the separate heat pump units to be attached to the spindle. The spindle 522 has threaded end portions 525 and 527 of a diameter less than that of the central portion of the spindle. A cap 524 with an overhanging flange portion 529 is threaded onto the right end of the spindle, and a retainer nut 530 is threaded onto the left end of the spindle. A metal ring 528 is tightly fitted onto the central portion of the spindle, near its left end.

Each of the heat pump units has a notch in its upper right-hand corner (as shown in FIG. 15) which forms a longitudinally-extending projection 544. The device also has a notch 540 near its upper left-hand corner which forms a second projection 542 extending in the same direction as the projection 544.

In order to attach one of the separate heat pump units to the spindle 522, the retainer nut 530 is removed, projection 544 is pushed under the flange 529, projection 542 is pushed under the ring 528, and retainer nut 530 is replaced in order to prevent the projections 542 and 544 from sliding out from under the ring 528 and flange 529. Thus, defective separate heat pump units can be replaced quickly and simply, without removing the other units.

The heating or cooling capacity of the thermodynamic device 520 can be changed quite easily by simply adding or subtracting separate heat pump units. The units should be added or subtracted in opposed pairs, or other steps should be taken to maintain the rotational balance of the device 520 when changing the number of heat pump units.

Each of the heat pump units preferably is formed by conventional "expanded metal" techniques in which two metal sheets are bonded together, face-to-face, in all areas except those in which flow conduits and chambers 546 are to be formed. Then, liquid under high pressure is forced into the unbonded regions to inflate them and form the flow conduits and chambers. Then, the liquid is removed, a suitable working fluid is injected into the conduits and chambers, and the holes through which the fluid was injected are sealed. Appropriately-shaped notches 548 are provided for accomodating the flow of heating and cooling gases through appropriate guides (not shown). Also, holes 550 and 551 are provided to insulate various conduits and chambers 546 from one another. These holes can be filled with insulation if desired. Various baffles and guides can be provided within the skill of the art to ensure that the ambient fluids flow properly over the surfaces of each heat pump unit.

The thermodynamic device 520 is relatively simple to test and maintain. Each separate heat pump unit can be weighed to determine whether its working fluid has leaked out. The cost of manufacturing the thermodynamic device 520 is kept relatively low due to the fact that the heat pump units are identical. Thus, production of the units easily can be automated, and the units can be manufactured rapidly in large quantities.

The above description of the invention is intended to be illustrative only, and various changes and modifications in the embodiments described may occur to those skilled in the art. These may be made without departing from the scope of the invention, and thus it should be apparent that the invention is not limited to the specific embodiments illustrated in the drawings. For example, each of the various embodiments can be constructed in accordance with the structural concepts shown in the other embodiments, and these concepts may be used in combination with one another without departing from the invention.

I claim:

1. A rotary thermodynamic compressor comprising, in combination, a rotary drive shaft, a pair of conduits, each conduit forming a group of loops each of which is transverse to the rotational axis of said shaft, each of said loops having first and second sections extending outwardly from said axis at locations spaced from one another along said axis, said groups of loops being arranged about said rotational axis in opposed pairs with corresponding loops directly opposite one another, each of said groups extending around said rotational axis to tend to form a toroid whose axis extends in the same direction as said rotational axis, means for delivering a compressible fluid to each of said conduits so that said corresponding loops have the same amount of fluid in them to rotationally balance said compressor, and heat transfer means for conducting heat out of each of said first sections and into each of said second sections.

2. A compressor as in claim 1 in which each of said groups has the same number of loops, and the inlets and outlets of said conduits are connected together in parallel.

3. A compressor as in claim 1 in which said outwardly-extending sections are aligned adjacent one another in a first plane, said inwardly-extending sections are aligned adjacent one another in a second palne, said heat transfer means comprising means for conducting heat from outside said compressor towards said first plane, and for conducting heat from said second plane outside of said compressor.

* * * * *